United States Patent
You

(10) Patent No.: US 7,949,448 B2
(45) Date of Patent: May 24, 2011

(54) CALIBRATION APPARATUS FOR AIRBAG INFLATOR RESISTANCE

(75) Inventor: Chang Beom You, Seoul (KR)

(73) Assignee: Hyundai Motor Company, Seoul (KR)

( * ) Notice: Subject to any disclaimer, the term of this patent is extended or adjusted under 35 U.S.C. 154(b) by 706 days.

(21) Appl. No.: 11/970,236

(22) Filed: Jan. 7, 2008

(65) Prior Publication Data

US 2009/0055052 A1 Feb. 26, 2009

(30) Foreign Application Priority Data

Aug. 21, 2007 (KR) .................. 10-2007-0084080

(51) Int. Cl.
*G06F 17/00* (2006.01)
(52) U.S. Cl. .......... 701/45; 280/735; 280/736; 340/438
(58) Field of Classification Search .................. 701/45; 324/711, 549; 439/660, 436, 352; 280/735, 280/736, 648
See application file for complete search history.

(56) References Cited

U.S. PATENT DOCUMENTS

| | | | | |
|---|---|---|---|---|
| 3,378,810 A | * | 4/1968 | Dorrell | 439/436 |
| 4,973,859 A | * | 11/1990 | Shodai | 307/10.1 |
| 5,490,690 A | * | 2/1996 | Mihm | 280/728.2 |
| 5,541,523 A | * | 7/1996 | Tourville et al. | 324/711 |
| 5,590,899 A | * | 1/1997 | Nakane et al. | 280/728.2 |
| 5,612,623 A | * | 3/1997 | Watanabe et al. | 324/549 |
| 5,811,978 A | * | 9/1998 | Tsubone | 324/678 |
| 6,048,228 A | * | 4/2000 | Aso | 439/660 |
| 6,200,167 B1 | * | 3/2001 | Aso | 439/660 |
| 6,896,538 B2 | * | 5/2005 | Grubbs | 439/352 |
| 7,101,893 B2 | * | 9/2006 | Crew | 514/300 |
| 2005/0121894 A1 | * | 6/2005 | Brisighella et al. | 280/741 |

* cited by examiner

*Primary Examiner* — Thomas G Black
*Assistant Examiner* — Marthe Marc Coleman
(74) *Attorney, Agent, or Firm* — Morgan, Lewis & Bockius LLP

(57) ABSTRACT

Disclosed is a calibration apparatus for an airbag inflator resistance. The calibration apparatus for an airbag inflator resistance includes: an airbag inflator unit for applying a deployment signal for deployment of an airbag; a resistance detection unit for detecting a change in the resistance of the airbag inflator connector; and a control unit for self-cleaning the airbag inflator connector in accordance with the resultant resistance detected by the resistance detection unit. The calibration apparatus is effective in preventing malfunction of an airbag warning light and ensuring reliability by preventing an increase in resistance due to the contamination of the airbag inflator by the self-diagnosing and self-cleaning effect using an electric current.

10 Claims, 4 Drawing Sheets

CALIBRATION APPARATUS FOR AIRBAG INFLATOR RESISTANCE

CROSS-REFERENCE TO RELATED APPLICATION

This application claims the benefit of Korean Application No. 2007-0084080, filed Aug. 21, 2007 in the Korean Intellectual Property Office, the disclosure of which is incorporated herein by reference.

BACKGROUND OF THE INVENTION

1. Field of the Invention

The present invention relates to a calibration apparatus for an airbag inflator resistance, and more particularly, to a calibration apparatus for an airbag inflator resistance, which prevents malfunction of an airbag warning light and ensures reliability of the airbag device by preventing an increase in resistance occurring due to the contamination of the airbag inflator by use of the self-cleaning effect using an electric current.

2. Description of the Related Art

Generally, an airbag device is a safety device for protecting a driver or a fellow passenger, which alleviates an impact applied to the driver or the fellow passenger by detecting an impact at the moment of a vehicle crash and deploying the airbag instantaneously before the passengers hit the vehicle body, thereby protecting the driver or the fellow passenger from a secondary impact caused by the vehicle crash.

The airbag cushion of airbag device is expanded by an inflator and the inflator is connected with airbag inflator connector. In the event the sensors of the airbag device sense a vehicle condition for which inflation of the air bag cushion is desired, a controller sends an electric actuating signal to the airbag inflator connector. Therefore, the reliability of the airbag device sometimes depends on the status of the airbag inflator connector as explained next.

Such an airbag device is equipped with a self-diagnosis function, and thus informs the driver of the current state of airbag device by turning on a warning light or the like depending upon the failure situation in the event of an airbag failure.

In an airbag self-diagnosis system of a mass-produced vehicle, the airbag self-diagnosis system sometimes malfunctions due to an increase in contact resistance caused by an accumulation formed by the contamination of an airbag inflator connector terminal because of pollutants such as cigarette smoke, soot, an aromatic agent, etc. Hence, it occurs often that the warning light is turned on even if there is no malfunction in the condition of the airbag, which hurts the reliability of the self-diagnosis system of the airbag device.

Accordingly, there is a need for a measure for preventing malfunction of the self-diagnosis system of the airbag device by eliminating the contamination formed on the airbag inflator connector terminal after self-diagnosis of the contamination.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

The present invention has been made in an effort to solve the aforementioned problems associated with prior arts.

Accordingly, it is an object of the present invention to prevent malfunction of an airbag warning and ensure reliability by self-cleaning the contamination of an airbag inflator connector terminal by using an electric current.

In order to achieve the aforementioned object and other objects, a calibration apparatus for an airbag inflator resistance in accordance with the present invention comprises: an airbag inflator unit for applying a deployment signal for deployment of an airbag; a resistance detection unit for detecting a change in the resistance of the airbag inflator connector; and a control unit for self-cleaning the airbag inflator connector in accordance with the result resistance detected by the resistance detection unit.

Meanwhile, a method for controlling a calibration apparatus for an airbag inflator resistance in accordance with the present invention comprises: the self-diagnosis step of measuring the resistance of an airbag inflator connector in real time; the detection step of comparing the measured resistance of the airbag inflator connector with a reference resistance; and the self-cleaning step of applying a current for self-cleaning the airbag inflator connector of the airbag inflator if the measured resistance is higher than the reference resistance.

The above features and advantages of the present invention will be apparent from or are set forth in more detail in the accompanying drawings, which are incorporated in and form a part of this specification, and the following Detailed Description of the Invention, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION OF THE PREFERRED EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, the present invention will be described with reference to the drawings.

Figure 1:
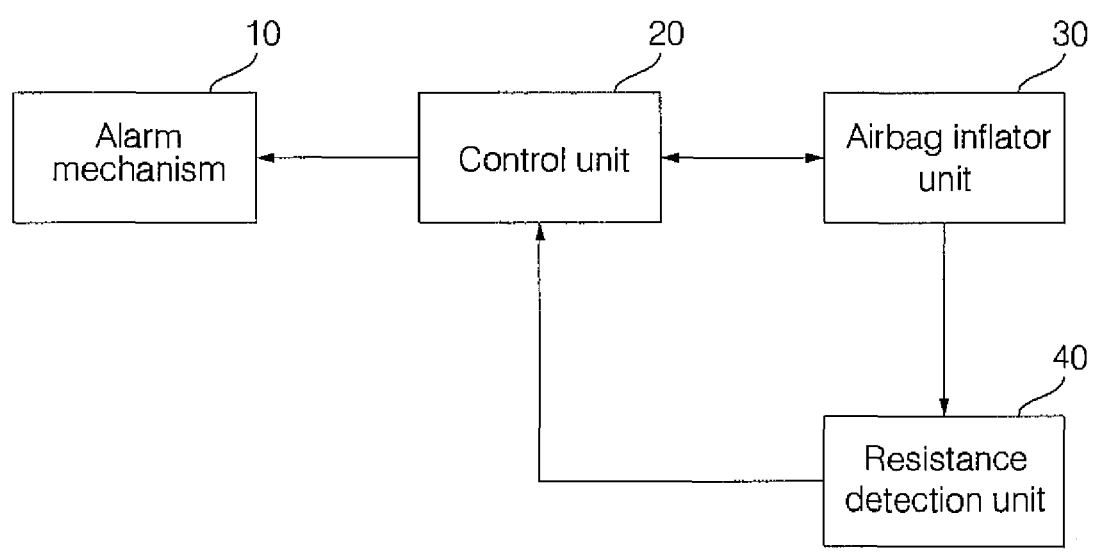
FIG. 1 is a block diagram showing the configuration of a calibration apparatus for measuring a resistance of the airbag inflator connector and its self-cleaning in accordance with one embodiment of the present invention.

FIG. 1 is a block diagram showing the configuration of a calibration apparatus for measuring a resistance of the airbag inflator connector and its self-cleaning in accordance with one embodiment of the present invention.

Referring to FIG. 1, the calibration apparatus for measuring a resistance of the airbag inflator connector and its self-cleaning includes an alarm mechanism 10, a control unit 20, an airbag inflator unit 30, and a resistance detection unit 40.

The control unit 20 transmits a signal for diagnosing the malfunction of the airbag inflator unit 30, and lets a self-cleaning current flow to eliminate impurities on the airbag inflator unit 30 or outputs an operating signal of the alarm mechanism in the event of a malfunction of the airbag inflator unit 30.

The self-cleaning effect refers to the effect of eliminating pollutants by applying the same or more than a predetermined amount of current to a contact end portion, such as a connector terminal.

In detail, when the control unit 20 transmits a current signal for diagnosing the airbag inflator unit 30, the resistance detection unit 40 detects the current signal flowing through the airbag inflator unit 30 and measures the resistance of the airbag inflator unit 30, and feedback the measured result thereof to the control unit 20 in an exemplary embodiment of the present invention.

Based on the transmitted resistance value, the control unit 20 determines whether the control unit 20 may output a signal for operating the alarm mechanism 10 and/or apply a self-cleaning current to the airbag inflator unit 30.

Figure 2:
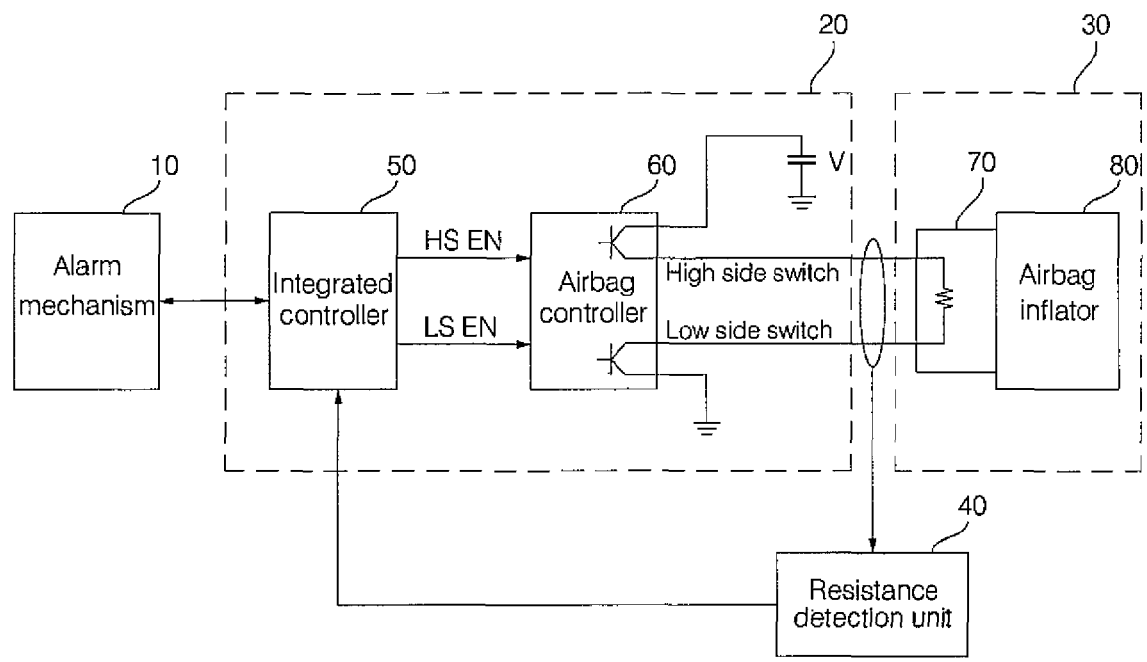
FIG. 2 is circuit diagram showing the configuration of the circuit of the calibration apparatus for measuring a resistance of the airbag inflator connector and its self-cleaning in accordance with one embodiment of the present invention.

FIG. 2 is circuit diagram showing the configuration of the circuit of the calibration apparatus for measuring a resistance of the airbag inflator connector and its self-cleaning in accordance with one embodiment of the present invention.

Referring to FIG. 2, the circuit includes an integrated controller 50 and an airbag controller 60 in the control unit 20, an airbag inflator connector 70 and an airbag inflator 80 in the airbag inflator unit 30, a resistance detection unit 40 for measuring the resistance of the airbag inflator connector 70, and an alarm mechanism 10.

First of all, the self-diagnosis mechanism will be explained hereinafter.

To apply a self-diagnosis current V, first, the integrated controller 50 of the control unit 20 applies a HS (high side) voltage signal and an LS (low side) voltage signal and thus the HS switch and LS switch of the airbag controller 60 are opened. Then a self-diagnosis current V flows to the airbag inflator connector 70 in the airbag inflator unit 30.

As for the specification of the self-diagnosis current V, the cycle ranges from 200 to 400 ms, and a current of about 35 to 40 mA is inputted for 2 ms. The self-diagnosis current V goes out through the HS switch and returns into the control unit 20 through the LS switch as shown in FIG. 2.

The resistance detection unit 40 detects a current before and after the self-diagnosis current V passes through the airbag inflator connector 70 to measure the resistance and feedback the result of detection to the integrated controller 50 in the control unit 20.

The airbag inflator connector 70 is connected to the airbag inflator 80 by ultrasonic welding. The ultrasonic welding refers to melting and bonding by converting an electrical energy into a mechanical energy through a vibration difference and then generating an instantaneous frictional heat on a bonded surface upon transferring the mechanical energy to a welding material through a horn, and is used for plastic welding, fabric and film stitching, and metal welding.

The reference resistance of the airbag inflator connector 70 is 1.8 to 2.29Ω. Although different depending on types of cars due to the accumulation formed by the contamination of the connector terminal by cigarette smoke, soot, an aromatic agent, etc., usually an increase in resistance of 5 to 8Ω is recognized and transmitted to the integrated controller 50 by the resistance detection unit 40.

Depending on an amount in the resistance of the airbag inflator connector 70, the integrated controller 50 transmits, to the airbag controller 60, a signal for applying a current self-cleaning the airbag inflator connector 70, or informs the driver of an airbag failure state by outputting an operating signal of the alarm mechanism 10.

Hereinafter, the self-cleaning mechanism will be explained in detail.

In order to prevent the phenomenon of resistance increase caused by pollutants adhered on the airbag inflator connector 70, when a measured resistance higher than the reference resistance of the airbag inflator connector is detected by the control unit 20 in real time through the resistance detection unit 40, the self-cleaning current is applied to the airbag inflator connector 70 to eliminate the pollutants on the connector terminal by applying a current of 90 to 110 mA for about 3 seconds in an exemplary embodiment of the present invention. However the time period to eliminate the pollutants is not limited thereto.

Regarding the self-cleaning current, a current of 90 to 110 mA, preferably, a current of 100 mA, is applied for about 3 seconds. A detailed description of the amount of application of the self-cleaning current will be made.

Figure 3:
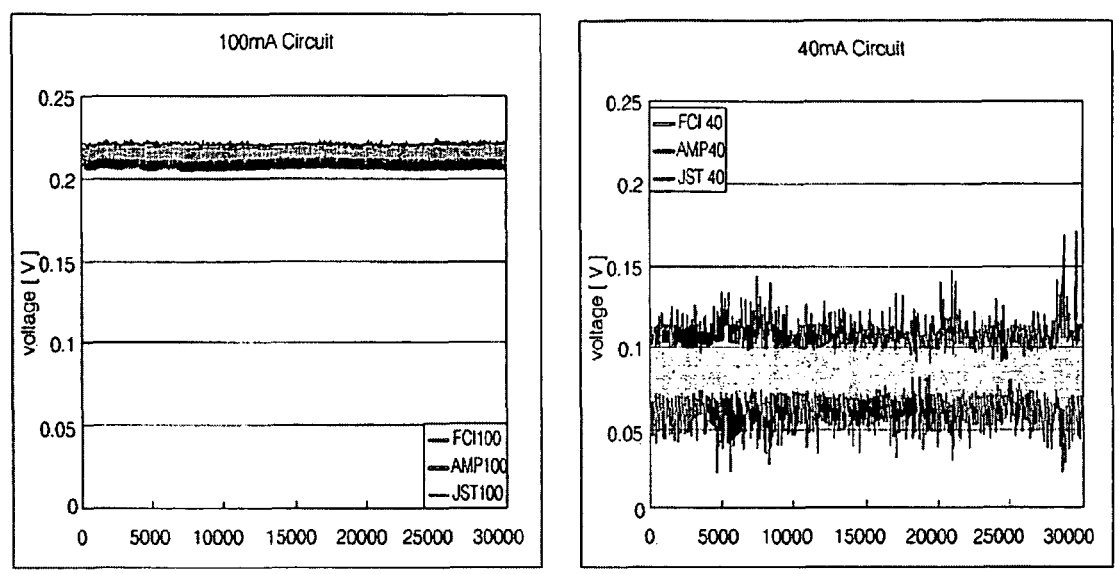
FIG. 3 is a view showing a result of an experiment in which a self-cleaning current for airbag inflator connector of the calibration apparatus in accordance with one embodiment of the present invention is set in two types of 100 mA and 40 mA.

FIG. 3 is a view showing a result of an experiment in which a self-cleaning current of the calibration apparatus for an airbag inflator resistance in accordance with one embodiment of the present invention is set in two types of 100 mA and 40 mA.

Referring to FIG. 3, a voltage drop at a current of 40 mA shows an amplitude of about 130 mV at maximum, while a voltage drop in a circuit of 100 mA shows an amplitude of about 20 mV, which is more stable.

At 40 mA, the average value of contact resistance hardly changes, but there is a possibility of an increase in contact resistance. At 100 mA, any significant change is not observed, and there is shown a self-cleaning effect of pollutants.

Figure 4:
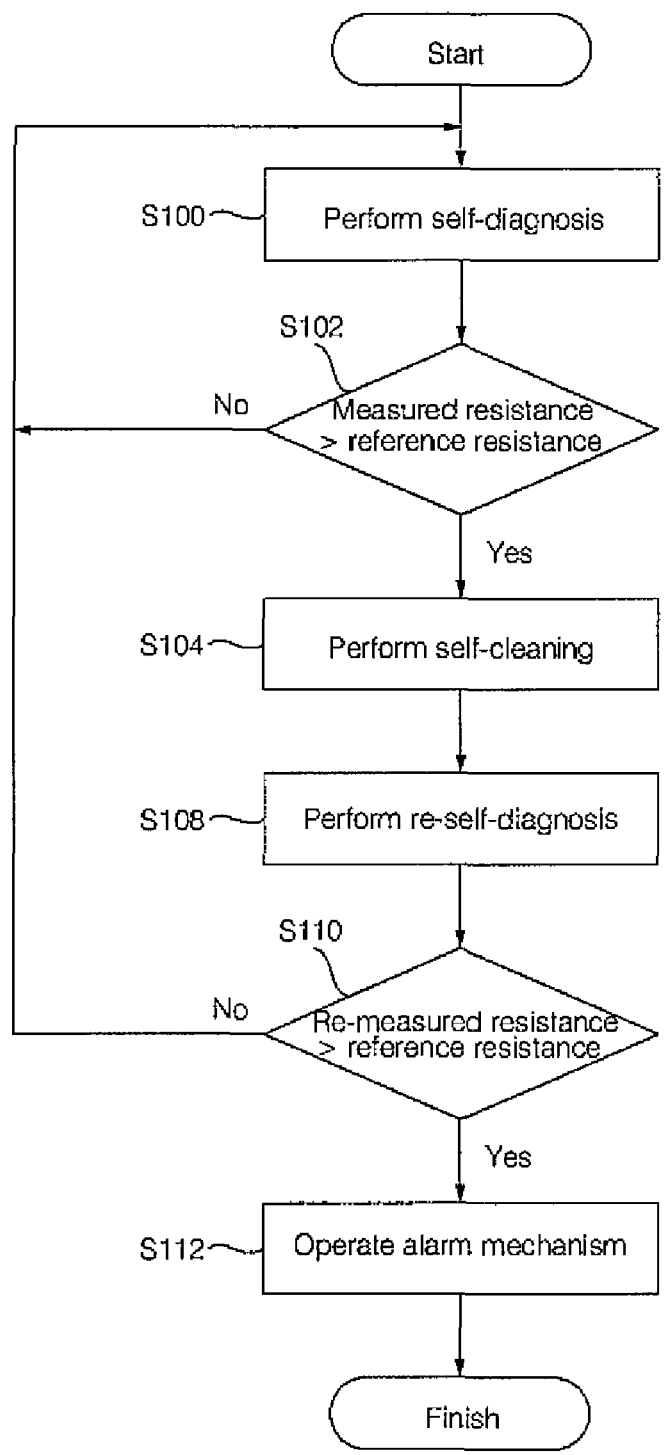
FIG. 4 is a sequence view showing a method for controlling a calibration apparatus for measuring a resistance of the airbag inflator connector and its self-cleaning in accordance with one embodiment of the present invention.

FIG. 4 is a sequence view showing a method for controlling a calibration apparatus for measuring a resistance of the airbag inflator connector and its self-cleaning in accordance with one embodiment of the present invention.

The first self-diagnosis for measuring a resistance of the airbag inflator connector in real time is performed (S100). At this step, the resistance of the airbag inflator connector 70 is measured and the measured resistance and a reference resistance are compared with each other (S102).

As a result of comparison of S102, if the measured resistance is not greater than the reference resistance, the self-diagnosis step is performed again, while if the measured resistance is equal to or greater than the reference resistance, the self-diagnosis mode is stopped and starts the self-cleaning step of eliminating pollutants on the airbag inflator connector 70 (S104).

In the self-cleaning step of S104, the self-cleaning current set forth above is applied to the airbag inflator connector 70 to eliminate the pollutants on the connector terminal by applying a current of 90 to 110 mA for about 3 seconds.

The reference resistance refers to a resistance when the airbag inflator connector 70 is not contaminated, and has a range of 1.8 to 2.2Ω. The measured resistance refers to a resistance measured by the resistance detection unit 40 before the airbag controller 60 performs the self-cleaning step on the airbag inflator connector 70. The measured resistance may have a resistance of 5 to 8Ω, though different depending upon vehicle type, if the airbag inflator connector 70 is contaminated by pollutants, such as cigarette smoke, soot, an aromatic agent, etc.

After the self-cleaning, the re-self-diagnosis step of re-measuring the resistance of the airbag inflator connector 70 is performed (S108).

After the re-self-diagnosis step, the re-detection step for comparing the re-measured resistance of the airbag inflator connector with the reference resistance is performed (S110). If the re-measured resistance is not greater than the reference resistance, the first self-diagnosis step of S100 is performed again, while if the re-measured resistance is equal to or greater than the reference resistance, the alarm mechanism 10 is operated.

Upon operating the alarm mechanism 10, the driver detects a malfunction of the airbag, and if the measured resistance is not greater than the reference resistance, self-diagnosis is continuously and/or periodically performed to repeat the above-described process.

As aforementioned, the preferred embodiment of the present invention has been shown and described, but the present invention is not limited to the specific embodiments described above, and can be implemented in various modifications by those skilled in the art to which the present invention pertains without departing from the scope of the present invention recited in the appended claims, and such modifications should not be understood to depart from the technical spirit or prospect of the present invention.

What is claimed is:

1. A calibration apparatus for an airbag inflator resistance, comprising:
   an airbag inflator unit for applying an airbag deployment signal;
   a resistance detection unit for detecting a change in the resistance of the airbag inflator unit; and
   a control unit for self-diagnosing and self-cleaning the airbag inflator unit;
   wherein the airbag inflator unit comprises an airbag inflator connector connected between an airbag inflator of the airbag inflator unit and the control unit to apply the airbag deployment signal;
   wherein the control unit comprises an integrated controller for transmitting a self-diagnosing signal and an airbag controller for applying a self-diagnosing current to the airbag inflator connector upon receipt of the self-diagnosis signal from the integrated controller;
   wherein the integrated controller transmits a self-cleaning signal to the airbag controller for applying a self-cleaning current to the airbag inflator connector upon receipt of the self-cleaning signal from the integrated controller in accordance with a result of measured resistance of the airbag inflator connector detected by the resistance detection unit during the self-diagnosing to eliminate impurities on the airbag inflator connector.

2. The calibration apparatus of claim 1, wherein the airbag inflator connector is connected to the airbag inflator by ultrasonic welding.

3. The calibration apparatus of claim 1, wherein the self-diagnosing current ranges from 35-40 mA.

4. The calibration apparatus of claim 1, wherein if the measured resistance of the airbag inflator connector is 5 to 8Ω higher than a reference resistance, the control unit applies the self-cleaning current.

5. The calibration apparatus of claim 4, wherein the reference resistance is predetermined.

6. The calibration apparatus of claim 4, wherein the self-cleaning current ranges from 90 to 110 mA.

7. The calibration apparatus of claim 1, further comprising an alarm mechanism for alarming a malfunction according to the result of the measured resistance of the airbag inflator connector of the airbag inflator unit.

8. A method for controlling a calibration apparatus for an airbag inflator resistance, comprising first self-diagnosing and self-cleaning steps of:
   measuring a resistance of an airbag inflator connector;
   comparing the measured resistance of the airbag inflator connector with a reference resistance; and
   applying a current for first self-cleaning the airbag inflator connector if the measured resistance is higher than the reference resistance;
   wherein if the measured resistance is equal to or lower than the reference resistance, the first self-diagnosing and self-cleaning steps is repeatedly performed.

9. A method for controlling a calibration apparatus for an airbag inflator resistance, comprising first self-diagnosing and self-cleaning steps of:
   measuring a resistance of an airbag inflator connector;
   comparing the measured resistance of the airbag inflator connector with a reference resistance; and
   applying a current for first self-cleaning the airbag inflator connector if the measured resistance is higher than the reference resistance;
   re-measuring a resistance of the airbag inflator connector after first self-cleaning the airbag inflator connector;
   comparing the re-measured resistance of the airbag inflator connector with the reference resistance; and
   operating an alarm mechanism if the re-measured resistance is higher than the reference resistance.

10. The method of claim 9, wherein if the re-measured resistance is equal to or lower than the reference resistance, the first self-diagnosing and self-cleaning steps is performed.

* * * * *